(12) United States Patent
Jeong et al.

(10) Patent No.: US 8,247,518 B2
(45) Date of Patent: Aug. 21, 2012

(54) MULTI-LAYER POLYMER FILM FOR PRINTING AND COPYING

(75) Inventors: Taehoung Jeong, Suwon-si (KR); Kwang Soo Choi, Suwon-si (KR); Mary Elizabeth Klima, Lawrenceville, GA (US)

(73) Assignee: SKC Inc., Covington, GA (US)

( * ) Notice: Subject to any disclaimer, the term of this patent is extended or adjusted under 35 U.S.C. 154(b) by 468 days.

(21) Appl. No.: 12/474,788

(22) Filed: May 29, 2009

(65) Prior Publication Data
US 2010/0304127 A1 Dec. 2, 2010

(51) Int. Cl.
*C08G 64/00* (2006.01)
*C08G 63/02* (2006.01)

(52) U.S. Cl. ......... 528/190; 428/13; 428/14; 428/32; 428/39; 428/32.52; 428/215; 428/220; 428/323; 428/328; 428/412; 528/176; 528/193; 528/196; 528/271; 528/272

(58) Field of Classification Search .......... 428/13, 428/14, 32.39, 32.52, 215, 220, 323, 328, 428/412; 528/176, 190, 193, 196, 271, 272
See application file for complete search history.

(56) References Cited

U.S. PATENT DOCUMENTS 6,352,748 B1 * 3/2002 Aylward et al. ............... 428/14

* cited by examiner

*Primary Examiner* — Terressa Boykin
(74) *Attorney, Agent, or Firm* — Sughrue Mion, PLLC

(57) ABSTRACT

A multi-layer polymer film for printing and copying of the present invention comprising a two-layer polymer base film composed of layer A and layer B laminated on one side of the layer A, the layer B containing a filler in an amount of 50 to 3000 ppm and the layer A containing no filler or a filler in an amount of at least 1000 ppm and less than the B layer; an image receiving layer coated on the exposed surface of the layer A; and an antistatic layer coated on the exposed surface of the layer B, wherein the layer A having the image receiving coating layer and the layer B having the antistatic coating layer have average degrees of surface roughness (Ra) ranging from 10 to 60 nm and 50 to 150 nm, respectively, exhibits improved properties in terms of runnability, printing, optical (haze), antistatic, friction coefficient and anti-blocking properties, which can be advantageously used as an OHP film.

18 Claims, 1 Drawing Sheet

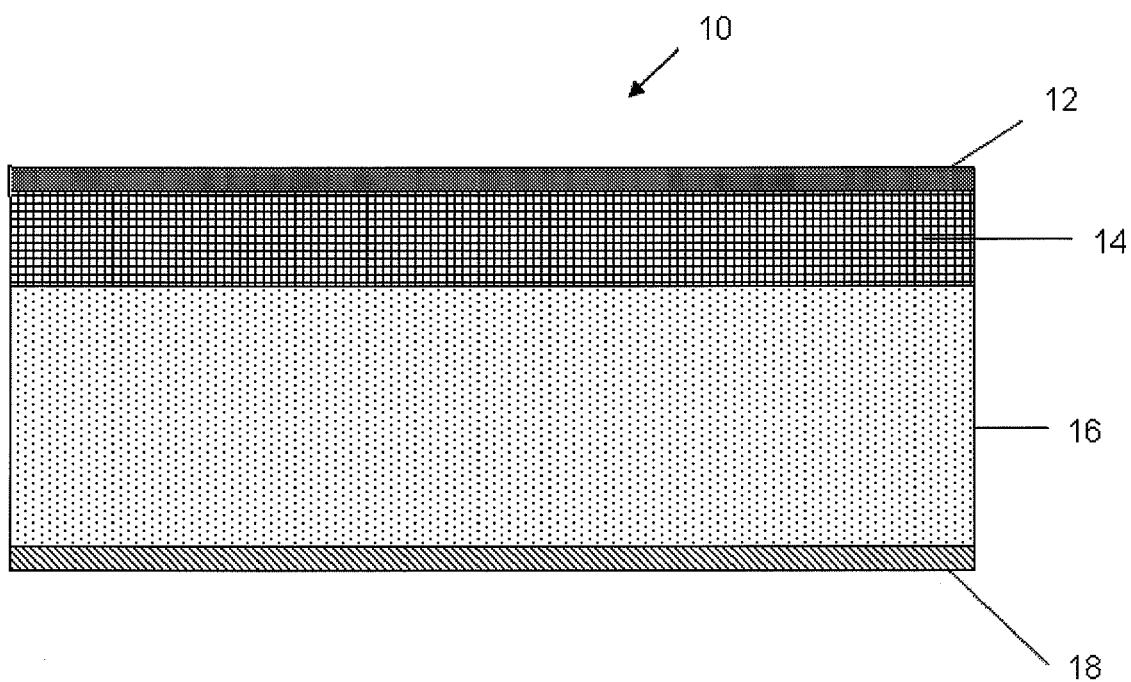

MULTI-LAYER POLYMER FILM FOR PRINTING AND COPYING

FIELD OF THE INVENTION

The present invention is directed to a multi-layer polymer film for printing and copying, which has improved runnability and printing properties suitable for an overhead projector (OHP) application.

BACKGROUND OF THE INVENTION

A conventional film used for an overhead projector (OHP) application is generally prepared by cutting a roll-type film into a film sheet having a predetermined size, printing or copying a desired image on one surface of the film sheet, and, if necessary, further cutting the film sheet having the printed image.

Such a film used for printing and copying is required to have satisfactory characteristics in terms of toner adhesion property (printing property); antistatic property for suppressing copy degradation during continuous copying, which might occur due to static charge buildup on the surface of the film substrate; friction coefficient and anti-blocking properties to prevent during continuous copying jamming or simultaneous transfer of multiple overlapping films; and runnability to allow high speed-copying without causing jamming or the generation of scratches. In particular, good runnability needed for high speed-copying is critical in increasing the productivity of OHP films.

Therefore, most films developed hitherto for printing and copying are generally composed of a toner receiving binder, an antistatic agent, a slipping agent, and a catalyst (U.S. Pat. Nos. 3,854,942, 4,071,362, 4,415,626, 4,489,122 and 5,310,591), but the above components tend to cause blocking among films, making it difficult to achieve smooth continuous copying. In addition, in order to improve the runnability property of a film, a filler which is capable of making the film surface roughness at a desired level is added during a film manufacturing process. However, the use of a filler usually causes lowering of the optical characteristics of the film, e.g., poor haze. Thus, the use of a filler in an amount suitable for meeting required haze standard leads to an unsatisfactory surface roughness.

Accordingly, for the purpose of achieving smooth transfer of films during printing and copying, a piece of paper is added to one surface of each film to be transferred in a tipped or paperback form, instead of the untipped or bareback form. However, such use of paper creates the problems of high cost and the need for waste treatment after use.

SUMMARY OF THE INVENTION

Accordingly, it is an object of the present invention to provide a polymer film for printing and copying having improved properties in terms of runnability, printing, optical (haze), antistatic, friction coefficient and anti-blocking properties, which can be advantageously used as an OHP film.

In accordance with the present invention, there is provided a multi-layer polymer film comprising:

a two-layer polymer base film composed of layer A and layer B laminated on one side of the layer A, the layer B containing a filler in an amount of 50 to 3000 ppm and the layer A containing no filler or a filler in an amount of at most 1000 ppm and less than the B layer;

an image receiving layer coated on the exposed surface of the layer A; and an antistatic layer coated on the exposed surface of the layer B, wherein the layer A having the image receiving coating layer and the layer B having the antistatic coating layer have average degrees of surface roughness (Ra) ranging from 10 to 60 nm and 50 to 150 nm, respectively.

BRIEF DESCRIPTION OF THE DRAWINGS

The above and other objects and features of the present invention will become apparent from the following description of the invention, when taken in conjunction with the accompanying drawing, FIG. 1, which shows a cross-sectional view of a multi-layer polymer film in accordance with one embodiment of the present invention.

DESCRIPTION ON DRAWING SYMBOLS

10: multi-layer polymer film
12: antistatic layer
14: layer B of polymer base film
16: layer A of polymer base film
18: image receiving layer

DETAILED DESCRIPTION OF THE INVENTION

The multi-layer polymer film in accordance with the present invention is characterized by comprising a polymer base film composed of smooth layer A and rough layer B laminated on one side of the layer A which contain fillers in amounts different from each other, an image receiving layer coated on the exposed surface of the layer A and an antistatic layer coated on the exposed surface of the layer B, wherein the layer A having the image receiving coating layer and the layer B having the antistatic coating layer have average degrees of surface roughness (Ra) ranging from 10 to 60 nm and 50 to 150 nm, respectively. A cross-sectional view of a multi-layer polymer film in accordance with one embodiment of the present invention is shown in FIG. 1.

The A/B two-layer polymer base film may be made of polymers selected from the group consisting of polyesters such as polyethylene terephthalate (PET) and polyethylene naphthalate (PEN), polycarbonates, polyimides, polysulfones, cellulose trivinylacetate, and a mixture thereof.

The polymer base film may have a thickness ranging from 30 to 250 μm. Preferably, the layers A and B may have thicknesses of 50 to 95% and 5 to 50% based on the total thickness of the base film, respectively. The layer A contains no filler, or it contains a filler in an amount of at most 1000 ppm and less than the B layer, preferably in an amount of 50 to 200 ppm. The layer B contains the filler in an amount of 50 to 3000 ppm, preferably 200 to 1500 ppm. In other words, the layer A is a relatively thick and smooth layer comprising a relatively small amount of a filler, and the layer B is a relatively thin and rough layer comprising a relatively large amount of a filler. Such a combination of the layers A and B satisfies both desired surface roughness and haze requirements for an OHP application.

Representative examples of the filler used in the present invention include silica, calcium carbonate, kaolin, titania, and a mixture thereof. The layer A may comprise a filler having an average particle diameter of 1.0 to 4.5 μm, preferably 2.5 to 3.5 μm, and the layer B, a filler having an average particle diameter of 2 to 8 μm, preferably 3 to 6 μm.

The inventive film has on the exposed surface of the layer A an image receiving coating layer having a thickness ranging from 50 to 1000 nm, preferably 100 to 300 nm, which is referred to as an adhesion layer for printing. The image receiving layer may comprise 25 to 85% by weight of a thermoplastic copolymer containing methylmethacrylate and butylacrylate residues, 3 to 12% by weight of a heat-curable polymer which can form cross-linking with the thermoplastic copolymer, 0.01 to 10% by weight of a reactive silicone-based slipping agent, 0.01 to 10% by weight of a fluorine-based anionic surfactant, 0.5 to 20% by weight of an anti-blocking agent, and 3 to 30% by weight of an antistatic agent. Combination of the thermoplastic copolymer and heat-curable polymer used in the image receiving layer serves as a binder resin component for enhancing adhesion capability to various toners and the base film. The image receiving layer in accordance with the present invention provides excellent processibility and optical property due to use of lower ratio of the binder resin and the antistatic agent components as compared with conventional image receiving layers.

The thermoplastic copolymer may contain 90% by mole or higher of methylmethacrylate and butylacrylate residues, preferably the content of the butylacrylate residues being 20 to 60% by mole. Besides the above-mentioned residues, the thermoplastic copolymer may contain 1 to 10% by mole of at least one residue selected from the group consisting of acrylamide, hydroxyethylmethacrylate, and acrylic acid residues. The thermoplastic copolymer may have a weight average molecular weight ranging from 50,000 to 500,000.

The heat-curable polymer which can form cross-linking with the thermoplastic copolymer may preferably contain per its repeating unit one or more functional groups selected from the group consisting of alkoxy, hydroxy, amino, amide, cyano, water-soluble blocked isocyanato, and a mixture thereof, of which representative examples include a melamine-formaldehyde resin, a urea-formaldehyde resin, a water-soluble blocked diisocyanate resin, and a mixture thereof.

If necessary, in order to accelerate a reaction between the thermoplastic copolymer and heat-curable polymer, the image receiving layer may further comprise a reaction catalyst such as ammonium thiocyanate, ammonium nitrate and ammonium chloride in an amount ranging from 0.01 to 10% by weight.

Representative examples of the anti-blocking agent used in the present invention include internally cross-linked acrylic beads (e.g., polymethylmethacrylate beads), silica, calcium carbonate, kaolin, titania, and a mixture thereof. The anti-blocking agent may preferably have an average particle diameter ranging from 2 to 10 μm. More preferably, a mixture of same or different kind of particles having varying particle sizes (multi-dispersion particles) within the above diameter range may be used as the anti-blocking agent in the present invention.

The slipping agent, which is a reactive silicone-based compound having at least one functional group selected from the group consisting of a conjugated double bond, a free hydrogen group joined to silicon (Si—H), an amino group and a hydroxy group, may be any one of conventional slipping agents.

The antistatic agent, which is a compound having at least one functional group selected from the group consisting of an alkoxy group, a hydroxy group, an amino group, and a conjugated double bond, may be any one of conventional antistatic agents.

The fluorine-based anionic surfactant may be any one of conventional surfactants.

The inventive film has on the exposed surface of the layer B an antistatic coating layer having a thickness ranging from 3 to 100 nm, preferably 10 to 50 nm, which is referred to as a write-on and wipe-off layer (WOWO layer). The antistatic layer may comprise 97 to 100% by weight of an antistatic agent and 0 to 3% by weight of a slipping agent. The antistatic layer maintains surface resistance of a film below $1 \times 10^{12}$ $\Omega/\square$, thereby efficiently giving to a film antistatic property as well as write-on and wipe-off property.

The antistatic agent used in the antistatic layer may be a quaternary ammonium salt-based compound, preferably the quaternary ammonium salt-based compound having two methyl and two $C_{8-12}$ alkyl substituents. In addition, representative examples of the slipping agent used in the antistatic layer include polyurethanes, silica, polyester-based waxes, and a mixture thereof.

The inventive film may further comprise other additives such as an antioxidant, an organic particle, an inorganic particle, a pigment, a UV absorber and a mixture thereof to the extent they do not adversely affect the film properties. Each of the additives may be any one of conventional ones, and it may be used in a conventional amount.

In accordance with the present invention, the polymer base film of the multi-layer polymer film may be prepared by blending a polymer resin and a suitable amount of a filler to separately form a chip for layer A and a chip for layer B, co-extruding the chips for the layers A and B while melt-mixing, biaxially drawing the co-extruded laminate sheet in both the longitudinal and transverse directions sequentially or simultaneously, and heat-setting the drawn laminate sheet with a conventional method. Preferably, the drawing in both the longitudinal and transverse directions may be performed such that the total drawing ratio is about 1.5 to about 10, and it may be performed at a temperature ranging from the glass transition temperature ($T_g$) to the softening temperature of the polymer resin.

Coating of each of the image receiving layer and the antistatic layer on the polymer base film may be conducted by a conventional method during or after a manufacturing process of the base film, for example, by applying an aqueous solution containing the above-mentioned specific components on the surface of the base film and heat-curing the coating layer. On the image receiving layer coated on the layer A, a desired image can be printed, and on the antistatic layer coated on the layer B, a desired letter can be wrote by using a marker and wiped off with a tissue or cloth.

The inventive multi-layer polymer film prepared by this method has average degrees of surface roughness (Ra) of 10 to 60 nm and 50 to 150 nm for the layer A having the image receiving coating layer and the layer B having the antistatic coating layer, respectively.

As described above, the inventive multi-layer polymer film can be advantageously used as an OHP film due to its superior runnability, printing, optical (haze), antistatic, friction coefficient and anti-blocking properties.

The following Examples are given for the purpose of illustration only, and are not intended to limit the scope of the invention.

EXAMPLE 1

Dimethyl terephthalate and ethylene glycol were blended at a 1:2 equivalent ratio, and 0.05% by weight of antimony oxide as a polymerization-condensation catalyst and a silica filler were added to the mixture. The reaction mixture was allowed to undergo a polymerization-condensation reaction to form each of a chip for layer A and a chip for layer B of a polyester resin having an ultimate viscosity of 0.61 dl/gr and a glass transition temperature of 73° C. 50 ppm of 2.3 μm-average particle diameter silica was used in the preparation of the chip for layer A, and 500 ppm of 3.5 μm-average particle diameter silica, in the preparation of the chip for layer B.

The chips for layers A and B thus obtained were co-extruded through a co-extruding die using a feed block to form an A/B laminate sheet. The laminate sheet thus obtained was drawn at a draw ratio of 2.5 in the longitudinal direction at 80° C. and at a draw ratio of 2.5 in the transverse direction at 125° C., and heat-set at 230° C., to obtain a biaxially drawn polymer base film of 100 μm thickness (layer A: 80 μm, layer B: 20 μm).

Separately, an aqueous solution for forming an image receiving layer was prepared by dissolving in the remaining amount of water 10% by weight of Primal 3298 (R&H Co.) as a thermoplastic copolymer, 0.5% by weight of Cymel 303 (Cynamid Co.) as a heat-curable polymer, 0.01% by weight of polyester-based wax as a slipping agent, 0.2% by weight of triton GR5M (Dow Co.) as a surfactant, 1.0% by weight of a mixture of Nyacol 215 (silica; PQ cooperation) and Artpearl (internally cross-linked polymethylmethacrylate beads; Dongjin Chemical) as an anti-blocking agent, and 4.0% by weight of Catanac SN (Cynamid Co.) as an antistatic agent, while uniformly mixing, to adjust the total weight of the solution to 100%. The silica and the internally cross-linked polymethylmethacrylate beads having varying particle sizes of 2, 3.5 and 6.5 μm were used in a weight ratio of 2:3:4, respectively.

Then, an aqueous solution for forming an antistatic layer was prepared by dissolving in the remaining amount of water 3.5% by weight of Unistat 3PN (Shinyoung Hwasung) as an antistatic and 0.05% by weight of ML160 (Michelman Co.) as a slipping agent, while uniformly mixing, to adjust the total weight of the solution to 100%.

The image receiving layer composition prepared above was coated on the layer A of the polymer base film using a mayor bar (#4) and subjected to heat-setting at 180° C. for 2 min, forming thereon an image receiving layer of 150 nm thickness. The antistatic layer composition prepared above was coated on the layer B of the polymer base film using a mayor bar (#4) and subjected to heat-setting at 180° C. for 2 min, forming thereon an antistatic layer of 20 nm thickness, to obtain an inventive multi-layer polymer film.

EXAMPLE 2

The procedure of Example 1 was repeated except for using 7.0% by weight of the antistatic agent in the preparation of an image receiving layer composition and controlling the final thickness of the image receiving layer to 100 nm, to obtain an inventive multi-layer polymer film.

EXAMPLE 3

The procedure of Example 1 was repeated except for using silica having an average particle diameter of 1.0 μm in the preparation of a chip for layer A and controlling the final thickness of the image receiving layer to 300 nm, to obtain an inventive multi-layer polymer film.

COMPARATIVE EXAMPLE 1

Dimethyl terephthalate and ethylene glycol were blended at a 1:2 equivalent ratio, and 0.05% by weight of antimony oxide as a polymerization-condensation catalyst and 500 ppm of a silica filler having an average particle diameter of 2.3 μm were added to the mixture. The reaction mixture was allowed to undergo a polymerization-condensation reaction to form a single chip of a polyester resin having an ultimate viscosity of 0.61 dl/gr and a glass transition temperature of 73° C.

The single chip thus obtained was melt-extruded through an extruding die to form a sheet. The sheet thus obtained was drawn at a draw ratio of 2.5 in the longitudinal direction at 80° C. and at a draw ratio of 2.5 in the transverse direction at 125° C., and heat-set at 230° C., to obtain a biaxially drawn single base film of 100 μm thickness.

Hereinafter, the procedure of Example 1 was repeated except for using 20% by weight of the thermoplastic copolymer, 1.0% by weight of the heat-curable polymer, 0.8% by weight of an anti-blocking agent, and 7.0% by weight of the antistatic agent in the preparation of an image receiving layer composition, wherein, as the anti-blocking agent, silica having particle diameters of 3.5 and 6.5 μm were used in a weight ratio of 1:3, and controlling the final thickness of the image receiving layer to 250 nm, to obtain a biaxially drawn polymer film having a single base film.

COMPARATIVE EXAMPLE 2

The procedure of Comparative Example 1 was repeated except for using 50 ppm of silica having an average particle diameter of 2.3 μm in the preparation of a single chip, to obtain a biaxially drawn single base film of 100 μm thickness. Then, the procedure of Example 1 was repeated except for using the single base film prepared above, to obtain a biaxially drawn polymer film having a single base film.

Performance Test

The polymer films obtained in Examples 1 through 3 and Comparative Examples 1 and 2 were each assessed for the following properties. The results are shown in Table 1.

(1) Surface Resistance (Ω/□)

The surface resistance for an image receiving layer side of a film sample was measured under a temperature of 23° C., a relative humidity of 60% and an applied voltage of 100V using a surface resistance tester (Model 19782, Desco Co. (U.S.A.)).

(2) Haze (%)

The haze of a film sample was measured with a hazemeter (XL 211, Gardener Co.).

(3) Static and Dynamic Friction Coefficients

According to ASTM D1894, the static and dynamic friction coefficients were determined by adding a load perpendicular to one surface of a film specimen, allowing the film specimen to slip, and measuring the resisting force generated against the slip with a load cell.

(4) Average Surface Roughness (nm)

According to DIN 4768, the average surface roughness was calculated by parallel placing both edges of a film specimen to a surface roughness tester (Model SE-30D, Kosaka Laboratory Ltd.), and dividing with the film length the sum of dimensions of each of the upper part and the lower part based on the central line of the cross-sectional curve thereof.

(5) Printing Property (Printing Adhesion Capability)

A UV-curable resin (U100, Sunkyoung UCB) was coated on the surface of a film sample using a #3 bar and subjected to UV-curing using a 180 w UV-lamp for 10 sec, to prepare a film specimen. According to ASTM D3359, a cross-cut region made on the film specimen was subjected to sequential adhesion and peeling using a cellophane adhesive tape. The printing adhesion capability was determined by comparing the prism shape of a coating layer remaining on the film surface with that in a standard table. The degree of the printing adhesion capability was assessed at an integer of 0 to 5, wherein a greater value means a high adhesion capability.

(6) Printing Speed

The jamming frequency of a film sample was measured while copying 100 A4-sized film specimens in a general copier. The printing speed was assessed by the following standards with the measured jamming frequency.
◎: 0
○: 1 to 5
Δ: more than 5

(7) Write-On and Wipe-Off (WOWO) Property

A letter was wrote on the surface of a film sample using a board marker and wiped off using Kinituff. The WOWO property was assessed by the following standards with the difference between light transmittances of the film before wrote on and after wiped off.
◎: 3% or less
○: more than 3% and 5% or less
Δ: more than 5% and 7% or less
×: more than 7%

TABLE 1

| | Surface resistance | haze | Friction coefficient | | Average surface roughness | | Printing property | Printing speed | WOWO property |
| --- | --- | --- | --- | --- | --- | --- | --- | --- | --- |
| | | | Dynamic | Static | layer A | layer B | | | |
| Ex. 1 | $1 \times 10^{12}$ | 2.0 | 0.2 | 0.23 | 51 | 85 | 5 | ◎ | ◎ |
| Ex. 2 | $1 \times 10^{12}$ | 1.8 | 0.21 | 0.26 | 50 | 84 | 4 | ◎ | ◎ |
| Ex. 3 | $1 \times 10^{12}$ | 2.3 | 0.23 | 0.29 | 48 | 85 | 4 | ○ | ◎ |
| C. Ex. 1 | $1 \times 10^{10}$ | 3.0 | 0.35 | 0.43 | 32 | 23 | 3 | Δ | ◎ |
| C. Ex. 2 | $1 \times 10^{12}$ | 1.8 | 0.34 | 0.42 | 48 | 24 | 5 | ○ | ◎ |

As shown in Table 1, the inventive multi-layer polymer films prepared in Examples 1 to 3 show improved properties in terms of optical property (haze), printing property and runnability, as compared with that of Comparative Example 1, and show improved runnability than that of Comparative Example 2.

While the invention has been described with respect to the above specific embodiments, it should be recognized that various modifications and changes may be made to the invention by those skilled in the art which also fall within the scope of the invention as defined by the appended claims.

What is claimed is:

1. A multi-layer polymer film comprising:
   a two-layer polymer base film composed of layer A and layer B laminated on one side of the layer A, the layer B containing a filler in an amount of 50 to 3000 ppm and the layer A containing no filler or a filler in an amount of at most 1000 ppm and less than the B layer;
   an image receiving layer coated on the exposed surface of the layer A; and
   an antistatic layer coated on the exposed surface of the layer B,
   wherein the layer A having the image receiving coating layer and the layer B having the antistatic coating layer have average degrees of surface roughness (Ra) ranging from 10 to 60 nm and 50 to 150 nm, respectively.

2. The multi-layer polymer film of claim 1, wherein the polymer base film has a thickness ranging from 30 to 250 μm.

3. The multi-layer polymer film of claim 1, wherein the layers A and B have thicknesses of 50 to 95% and 5 to 50% based on the total thickness of the base film, respectively.

4. The multi-layer polymer film of claim 1, wherein the layers A and B contain fillers in amounts of 50 to 200 ppm and 200 to 1500 ppm, respectively.

5. The multi-layer polymer film of claim 1, wherein the filler is selected from the group consisting of silica, calcium carbonate, kaolin, titania, and a mixture thereof.

6. The multi-layer polymer film of claim 1, wherein the fillers added to the layers A and B have average particle diameters of 1.0 to 4.5 μm and 2 to 8 μm, respectively.

7. The multi-layer polymer film of claim 1, wherein the image receiving layer comprises 25 to 85% by weight of a thermoplastic copolymer containing methylmethacrylate and butylacrylate residues, 3 to 12% by weight of a heat-curable polymer which can form cross-linking with the thermoplastic copolymer, 0.01 to 10% by weight of a reactive silicone-based slipping agent, 0.01 to 10% by weight of a fluorine-based anionic surfactant, 0.5 to 20% by weight of an anti-blocking agent, and 3 to 30% by weight of an antistatic agent.

8. The multi-layer polymer film of claim 7, wherein the thermoplastic copolymer contains 90% by mole or higher of methylmethacrylate and butylacrylate residues, the content of the butylacrylate residues being 20 to 60% by mole.

9. The multi-layer polymer film of claim 8, wherein the thermoplastic copolymer contains 1 to 10% by mole of at least one residue selected from the group consisting of acrylamide, hydroxyethylmethacrylate, and acrylic acid residues.

10. The multi-layer polymer film of claim 7, wherein the heat-curable polymer contains per its repeating unit one or more functional groups selected from the group consisting of alkoxy, hydroxy, amino, amide, cyano, water-soluble blocked isocyanato, and a mixture thereof.

11. The multi-layer polymer film of claim 10, wherein the heat-curable polymer is selected from the group consisting of a melamine-formaldehyde resin, a urea-formaldehyde resin, a water-soluble blocked diisocyanate resin, and a mixture thereof.

12. The multi-layer polymer film of claim 7, wherein the anti-blocking agent is selected from the group consisting of internally cross-linked acrylic beads, silica, calcium carbonate, kaolin, titania, and a mixture thereof.

13. The multi-layer polymer film of claim 12, wherein the anti-blocking agent is a mixture of particles having varying particle sizes ranging from 2 to 10 μm.

14. The multi-layer polymer film of claim 1, wherein the image receiving layer has a thickness ranging from 50 to 1000 μm.

15. The multi-layer polymer film of claim 1, wherein the antistatic layer comprises 97 to 100% by weight of an antistatic agent and 0 to 3% by weight of a slipping agent.

16. The multi-layer polymer film of claim 1, wherein the antistatic layer has a thickness ranging from 3 to 100 nm.

17. The multi-layer polymer film of claim 1, wherein the film is biaxially drawn at a total drawing ratio of 1.5 to 10 in both the longitudinal and transverse directions.

18. The multi-layer polymer film of claim 1, wherein the film is used as a film for an overhead projector application.

* * * * *